United States Patent [19]

Taggart

[11] Patent Number: 5,427,530
[45] Date of Patent: Jun. 27, 1995

[54] MODEL KIT AND METHOD FOR SIMULATING WATER POLLUTION

[76] Inventor: Judith F. Taggart, 2341 S. Ode St., Arliington, Va. 22022

[21] Appl. No.: 105,044

[22] Filed: Aug. 10, 1993

[51] Int. Cl.$^6$ ............................................. G09B 23/00
[52] U.S. Cl. .................................. 434/276; 434/151; 434/150; 434/429
[58] Field of Search ................ 434/295, 429, 433, 276, 434/225, 365, 126, 151, 152; 446/467, 444, 445, 434, 160, 163, 166, 153

[56] References Cited

U.S. PATENT DOCUMENTS

| | | |
|---|---|---|
| Re. 23,612 | 1/1953 | Abel . |
| 646,582 | 4/1900 | Murchá ............................ 434/152 |
| 1,278,632 | 9/1918 | Gerashshenevsky ........... 434/151 X |
| 1,393,163 | 10/1921 | Rasely ............................. 434/151 |
| 2,674,813 | 4/1954 | Hutchinson ..................... 434/152 |
| 3,384,991 | 5/1968 | Einfalt . |
| 3,475,834 | 11/1969 | Bugg ................................ 434/126 |
| 4,056,892 | 11/1977 | Atencio ........................... 434/151 |
| 4,170,839 | 10/1979 | O'Donnell ..................... 434/126 X |
| 4,371,995 | 2/1993 | Donhauser . |
| 4,515,360 | 5/1985 | Mariol . |

FOREIGN PATENT DOCUMENTS

634976 1/1962 Canada .
1039258 5/1965 Germany .

*Primary Examiner*—Gene Mancene
*Assistant Examiner*—Jeffrey A. Smith
*Attorney, Agent, or Firm*—Arnold, White & Durkee

[57] ABSTRACT

A portable water pollution model and method are disclosed that provide an improved device and method for simulating water pollution. The present invention includes a portable simulated watershed model, including a simulated body of water and a simulated water pollution source; a simulated water pollutant, placeable on selected portions of the model; a simulated best management practice for pollution minimization, placeable on selected portions of the model; and a fluid dispenser capable of simulating rain over the watershed model. The present invention further includes a method for simulating water pollution including providing a portable simulated watershed model, providing a simulated water pollutant, placing the simulated pollutant on selected portions of the model, providing a simulated best management practice, placing the simulated practice on selected portions of the model, and simulating rain over the model.

17 Claims, 5 Drawing Sheets

MODEL KIT AND METHOD FOR SIMULATING WATER POLLUTION

The present application is a continuing application under 35 U.S.C. §120 of co-pending application, Ser. No. 07/944,774, filed Sep. 14, 1992, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The present invention relates to the simulation of water pollution in a watershed from water pollution sources. The present invention also relates to the simulation of pollution minimization techniques and of the effect of such techniques on reducing pollution in a simulated watershed.

Water pollution sources in a watershed generate varied water pollutants. Water pollutants are generally classified as point source or non-point source pollutants. Point source pollutants are pollutants that are transported directly into a body of water, for example a pollutant transported through a pipe. Nonpoint source pollutants are pollutants transported by water running off land and into a body of water.

Pollution minimization techniques, or best management practices, are employed to keep pollutants from reaching a body of water. Best management practices include such techniques as grass strips to catch loose soil, manure containment structures to keep manure from washing into bodies of water, fences to limit the range of cattle, and berm and terraces to catch loose top soil from a plowed field.

Water pollution models are useful to demonstrate graphically water pollution, either as a simulation of pollution arising from actual or potential environmental conditions, or as a teaching tool to create awareness and understanding of water pollutant sources, water pollutants, and water pollution prevention techniques. Prior water pollution models have not been effective in graphically showing how water pollution begins in a watershed from water pollutants or in graphically illustrating pollution prevention techniques. In addition, prior water pollution models have been cumbersome and unwieldy and not portable.

SUMMARY OF THE INVENTION

A feature of the present invention is to provide a water pollution model that effectively demonstrates how water pollution begins in a watershed due to pollutants, including both point source and non-point source pollutants.

Another feature of the present invention is to provide a water pollution model that effectively simulates best management practices in a watershed and demonstrates the effect of such practices in keeping pollutants from reaching a body of water.

A further feature of the present invention is to provide a water pollution model that is portable, easy to manipulate, and reusable.

These and other features and advantages are accomplished by the present invention. The present invention provides a water pollution model that is portable, easy to manipulate, and reusable; that graphically demonstrates water pollution from varied sources, including point source pollutant sources and nonpoint source pollutant sources; and that graphically demonstrates best management practices and the effect of such practices on pollutants entering a simulated body of water. In addition the present invention provides a method for simulating water pollution and best management practices in a watershed.

The present invention contemplates a water pollution model that includes a portable simulated watershed model, including at least one simulated body of water and at least one simulated water pollution source; at least one simulated water pollutant, placeable on selected portions of the portable simulated watershed model; and a fluid dispenser capable of simulating rain over the watershed model to cause the at least one simulated water pollutant to be washed into the simulated body of water.

The present invention further contemplates that the at least one simulated water pollutant includes a plurality of simulated point source water pollutants and a plurality of simulated nonpoint source water pollutants.

The present invention further contemplates a portable water pollution model that further includes at least one simulated best management practice, placeable on selected portions of the simulated watershed model.

The present invention further contemplates a method for simulating water pollution including providing a portable simulated watershed model with at least one simulated body of water and at least one simulated water pollution source; providing at least one simulated water pollutant; placing the at least one simulated water pollutant on selected portions of the simulated watershed model; and simulating rain over the simulated watershed model to cause the water pollutants to be washed into the simulated body of water.

The present invention further contemplates a method for simulating water pollution with the additional steps of providing at least one simulated best management practice; and placing the at least one simulated best management practice on selected portions of the portable simulated watershed model prior to simulating rain over the simulated watershed model.

The present invention, therefore, provides a novel device and method that allows effective simulation of water pollution in a watershed. The foregoing objectives, features, and advantages of the present invention will be further appreciated from the detailed description provided below.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiment thereof which is illustrated in the appended drawings, which drawings form a part of this specification.

It is to be noted, however, that the appended drawings illustrate only sample embodiments of the present invention and are, therefore, not to be considered limiting of its scope, for the invention may admit to other equally effective embodiments.

DETAILED DESCRIPTION

One embodiment of a portable water pollution model according to the present invention includes a portable simulated watershed model, including a simulated body of water and a plurality of simulated water pollution sources; a plurality of simulated water pollutants, including point source and non-point source pollutants, placeable on selected portions of the simulated watershed model; and a fluid dispenser capable of simulating rain over the simulated watershed model to cause the plurality of simulated water pollutants to be washed into the simulated body of water.

Portable Simulated Watershed Model

Figure 1:
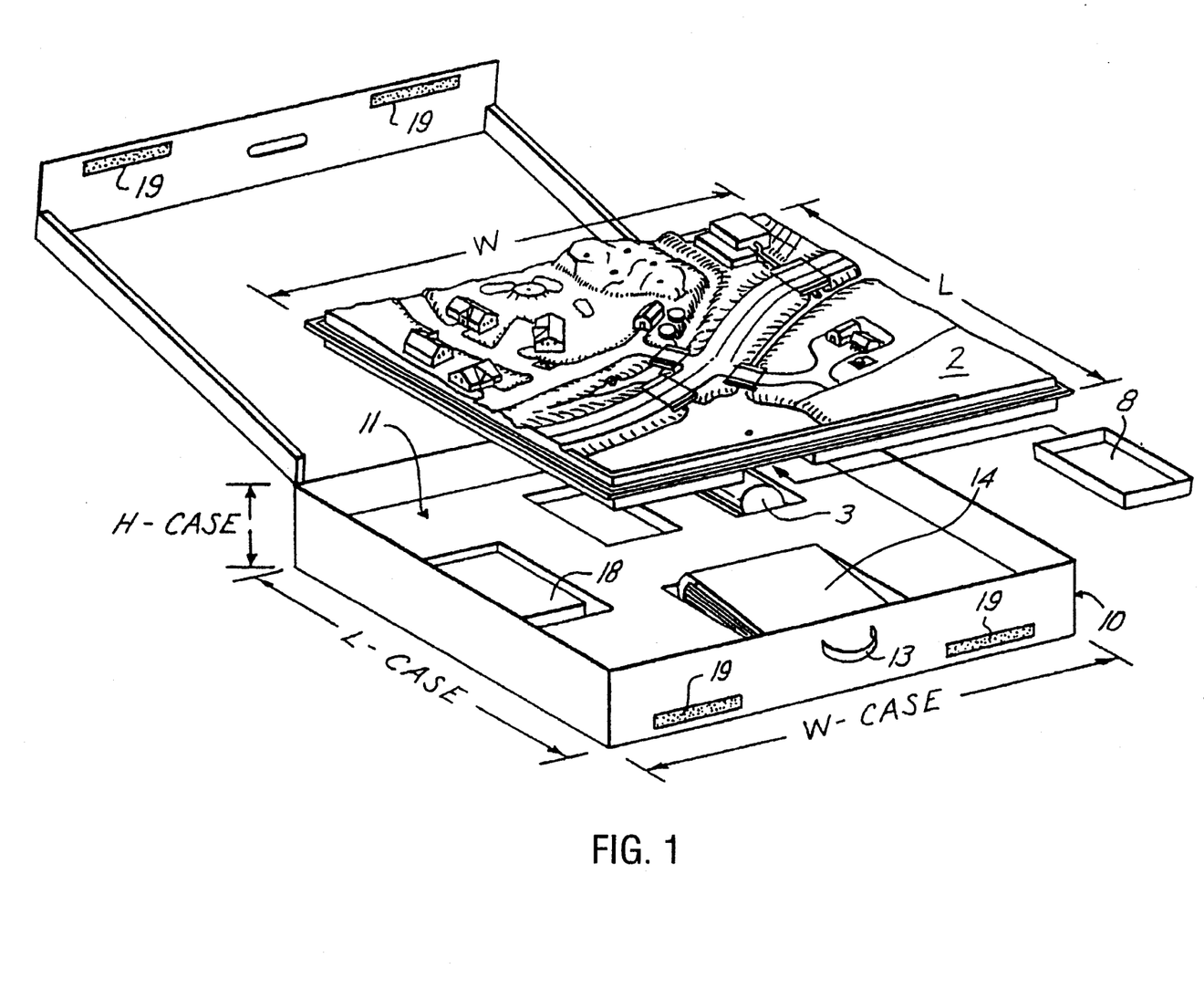
FIG. 1 is a perspective view of a portable simulated watershed model and carrying case according to the present invention.

FIG. 1 is a perspective view of a portable simulated watershed model 2 according to the present invention with a portable carrying case 10. FIG. 3 is a cross-section view of a portable simulated watershed model 2 taken through Section 3—3 of FIG. 2. In one particular embodiment, the length, L, and width, W, of the portable simulated watershed model 2 are approximately 24 inches by 28 inches. However, other dimensions would also be acceptable.

The bottom of the model 2 may take generally an inverted "U" shape, allowing for a bottom clearance, C, of approximately 2 inches so that a container 8 may be slid underneath the model 2 to catch water when the model 2 is drained. As shown in FIG. 1, the bottom of model 2 may also take the shape of an inverted open box, having an opening that is large enough to accommodate container 8. The simulated watershed is built on top of the inverted "U" bottom, and the the total height, h2, from the bottom of the portable simulated watershed model 2 to the top of the model features, is approximately 5 inches. The height, h1, from the bottom of the portable watershed model 2 to the ground level of the model features is approximately 3 inches. In one embodiment, a lip 12 surrounds the model and extends approximately ½ inches from the edge of the model. It should be noted that other dimensions for the above features would also be acceptable.

A portable carrying case 10 for the simulated watershed model may be provided to allow for easier movement of the portable simulated watershed model. The length, L-case, width, W-case, and height, M-case, of the portable carrying case may be approximately 26 inches, 30 inches, and 9 inches, respectively. Other dimensions would, however, be acceptable. Case 10 may be fitted with wheels to assist in transporting the model. Case 10 and model 2 maybe integrally formed.

The carrying case 10 has a lid that opens. Opposing hook-and-loop fastener strips 19 may be provided to secure the lid when it is closed. Other fasteners may also be used. A handle 13 extends through the lid to allow easy carrying. Alternatively, handle 13 may be formed upon the lid. An insert 11, made of STYROFOAM or other foam material, may be included in the carrying case 10 and may be contoured to hold various items. For example, space may be provided for instruction manual 14, container 18 (for holding moveable features, simulated water pollutants, and simulated best management practices), container 8 (for catching water), and fluid dispenser 3 (for simulating rain). Fluid dispenser 3 is shown in more detail in FIG. 6.

The simulated watershed model 2 is preferably made of a durable material that is capable of being easily cleaned for reuse and that is smooth enough to allow the simulated pollutants to flow with the simulated rain. The simulated watershed model 2 is preferably made from a light-weight material to make it portable. The portable carrying case 10 is also preferably made from a light-weight material. In one embodiment of the invention, the combined weight of Model 2, carrying case 10, insert 11, manual 14, containers 8 and 18 with their contents and dispenser 3, is approximately 16 pounds (7.3 kg).

One embodiment of the invention is made from high-impact polystyrene having a thickness of between approximately 0.050 and 0.125 inches (1.3–3.2 mm). The model is constructed using a vacuum thermoforming technique in which a sheet of high-impact polystyrene is placed in a frame and heated to a forming temperature of approximately 200° F. (94° C). Next, a mold is plunged into the frame so as to create a substantially airtight seal on the outer edges of the mold. A vacuum is then applied, and the high-impact polystyrene conforms to the shape of the mold. After cooling, the formed part is removed from the frame and appropriate finish trimming is accomplished by die-cutting or routing.

In one embodiment, a silicone female mold is created from a master mold, which was constructed out of resin-coated STYROFOAM brand foam material. Next, a tooling resin is used to cast a male vacuum forming mold from the silicone female mold. Vacuum holes are then placed in the male mold so that the high-impact polystyrene would retain as much of the mold detail as possible.

In one embodiment of the invention, color is applied to the model by spray painting through stencils, the stencils also being created using the vacuum forming process. The stencils are overlaid upon the model for each paint color, and color is applied by spray painting through the stencil. The model may then be clear coated to improve wear resistance.

Alternatively, the model is constructed of clear, high impact polystyrene, with the color features being screen printed on the polystyrene sheet prior to vacuum forming. After forming, the colors register to the appropriate topographical features of the model. With this embodiment, the screen printed inks are applied to the inside of the model, leaving only clear high-impact polystyrene on the working surface, thus protecting the colors during use or transport.

Features of Portable Simulated Watershed Model

Figure 2:
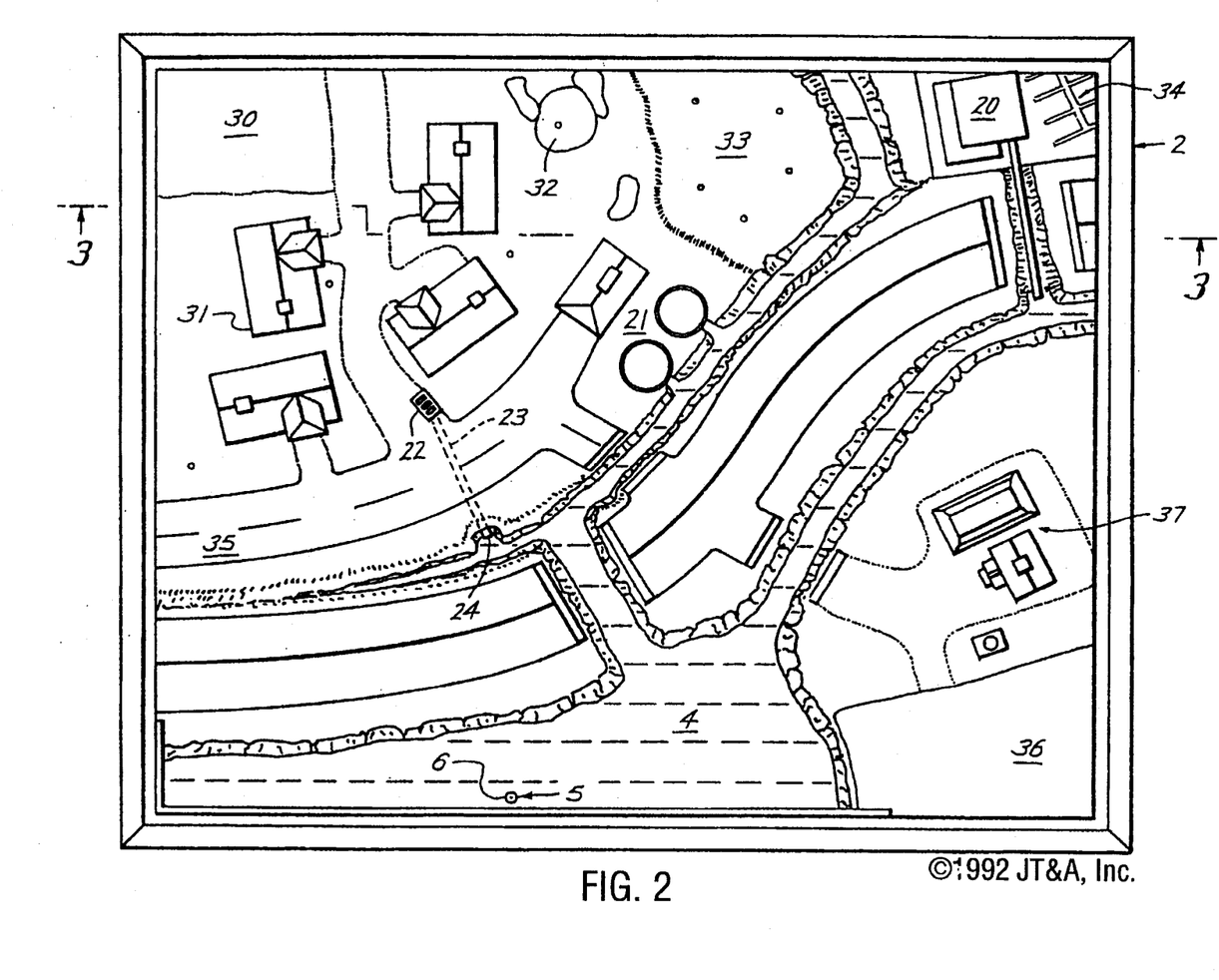
FIG. 2 is a top view of a portable simulated watershed model according to the present invention showing simulated water pollutant sources.
Figure 3:
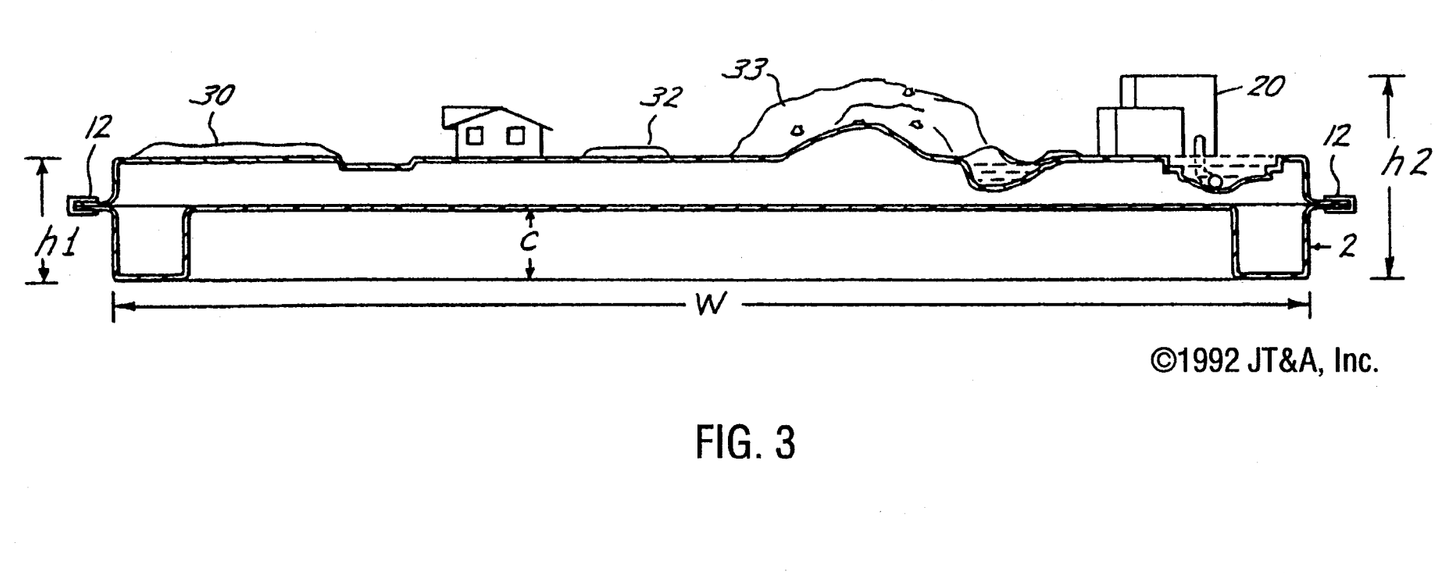
FIG. 3 is a cross-section view of the portable simulated watershed model of FIG. 2 according to the present invention.
Figure 4:
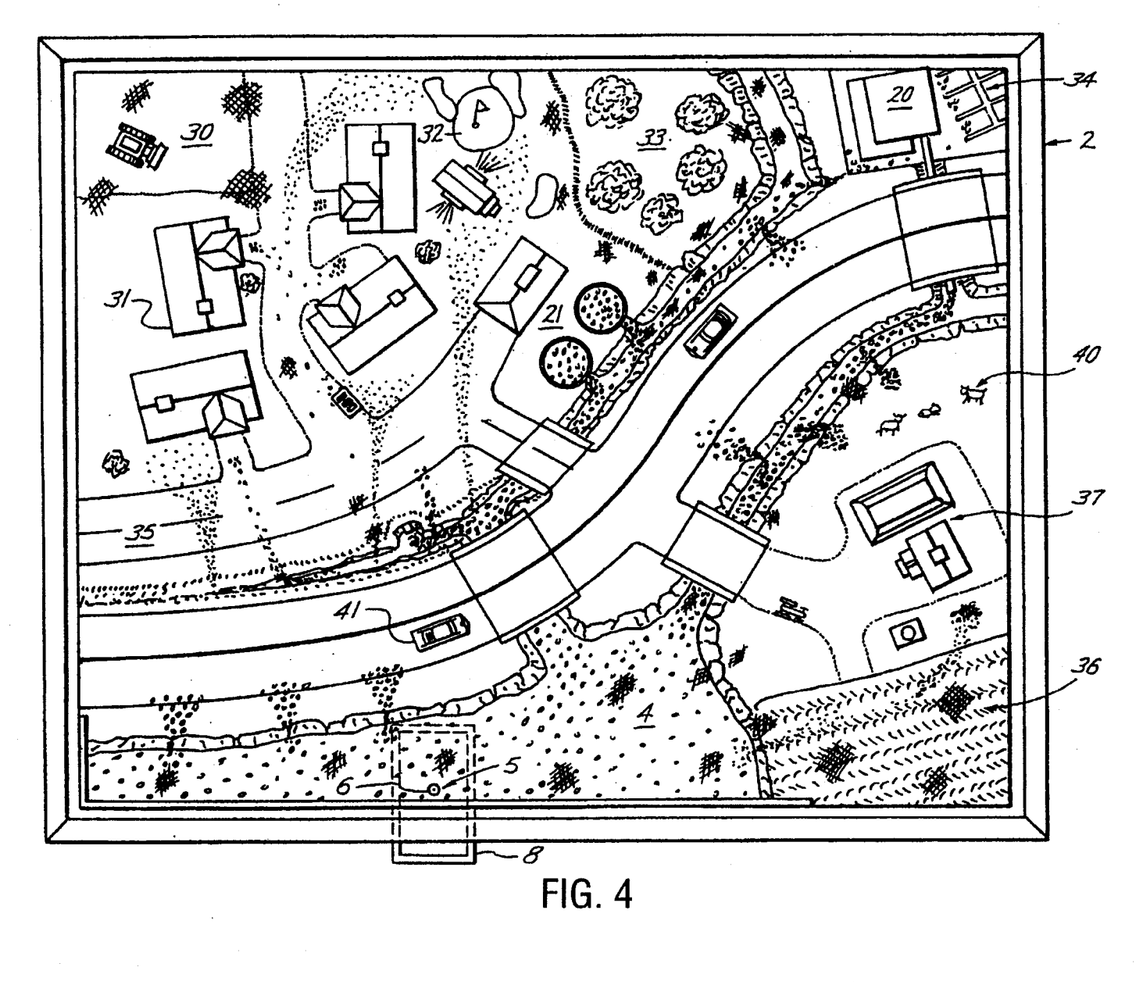
FIG. 4 is a top view of a portable simulated watershed model according to the present invention illustrating exemplary simulated water pollution sources and simulated water pollutants.

FIG. 2 provides a top view of a portable simulated watershed model 2 and shows a plurality of simulated water pollution sources. FIG. 4 provides a top view of a portable simulated watershed model 2 and shows additional features placeable on selected portions of the watershed model, such as simulated water pollutants, trees, bridges, and automobiles.

The simulated watershed model 2 is constructed such that when rain is simulated over the model 2, the simulated rain flows from other portions of the model into the simulated body of water 4. The portable simulated watershed model 2 includes only one simulated body of water 4, although more than one simulated body of water may be provided. At the bottom of the simulated body of water 4 is a drain hole 5 that allows the simulated body of water to be drained after simulation of water pollution. A stopper 6 is provided for sealing the drain hole 5. The portable watershed model 2 is contoured so that a container 8 may be placed under the portable watershed model 2 to catch the water when the simulated body of water 4 is drained. To simulate the body of water, tap water may be poured into the simulated body of water 4.

The portable simulated watershed model 2 further includes fixed simulated water pollutant sources, built into the model 2, including both point source and non-point source water pollutant sources. For example, fixed simulated point source pollutant sources are the simulated industrial plant 20, sewage plant clarifier tanks 21 and storm drain 22 which may be connected through tube 23 to simulated storm sewer pipe 24. Fixed nonpoint source pollutant sources include the construction site 30, the residential lawns 31, the golf course 32, the clear-cut forest 33, the parking lot 34, the road 35, the plowed field 36, and the farm 37.

The portable simulated watershed model 2 further includes moveable features, not built into the model 2, that represent simulated water pollutant sources. For example, moveable simulated water pollutant sources are the cows 40 and the automobile 41, which are both non-point source pollutant sources.

It should be noted that alternative embodiments of the present invention may include a portable simulated watershed model with only one simulated water pollution source. This simulated water pollution source may be either a point source or a non-point source pollutant source. This simulated water pollution source also may be either a fixed feature, immovably coupled to the portable simulated watershed model, or a moveable feature, placeable on selected portions of the model.

It should also be noted that according to the present invention, the portable simulated watershed model may include additional features not directly related to water pollution. The additional features may be fixed, immovably coupled to the portable simulated watershed model, or be moveable, placeable on selected portions of the portable simulated watershed model. For example, hills, roads, ditches, stream beds, storm drains, retention ponds and trees may be built into the portable simulated watershed model to make the model more realistic. Bridges, trees, automobiles, livestock, or construction vehicles may be added to the portable simulated watershed model so that they fit into particular places on the model or so that they may be placed anywhere on the model.

Simulated Water Pollutants

Water pollutants due to the simulated water pollutant sources may be simulated with a variety of substances. One embodiment of the present invention is to simulate water pollutants with food products generally available at a grocery store. For example, loose dirt may be simulated with powdered cocoa. Chemicals such as fertilizer and pesticides may be simulated with colored, powdered drink mixes. Automobile oil and fluids may be simulated with sesame oil. Discharge from commercial plants may be simulated with soy sauce.

FIG. 4 is a top view of a portable simulated watershed model 2 and shows simulated water pollutants in the form of bubbles, spots, and hashed lines. Pollutants from the simulated water pollutant sources may be simulated on the simulated watershed model 2 be placing the simulated water pollutants on selected portions of the simulated watershed model 2. For example, powdered cocoa (simulating loose dirt) may be sprinkled on the simulated watershed model 2 at the construction site 30, the plowed field 36, and the clear-cut forest 33 (for example, about ½ teaspoon on each). Powdered cocoa (simulating manure) may also be sprinkled on the simulated watershed model near the cows 40 on the farm 37 (for example, about ½ teaspoon). Colored drink mixes (simulating fertilizer and pesticides) may be placed on the simulated watershed model 2 at the residential home lawns 31 and the golf course 32 (for example, about ½ teaspoon on each). Sesame oil (simulating automobile oil and fluids) may be placed on the simulated watershed model 2 at the parking lot 34 and the road 35 and at the moveable cars 41 (for example, a few drops on each). Soy sauce (simulating discharge from commercial plants) may be placed on the simulated watershed model at the industrial plant 20 and the sewage plant clarifier tanks 21.

It should be noted that the listing of these particular types of substances as simulations for water pollutants is to be considered exemplary of the invention, and not delimiting. In general, the pollution simulating substances are preferably nontoxic and easily cleanable, in order to facilitate and encourage the use of the invention with and by children.

Fluid Dispenser Capable of Simulating Rain

Figures 5, 6:
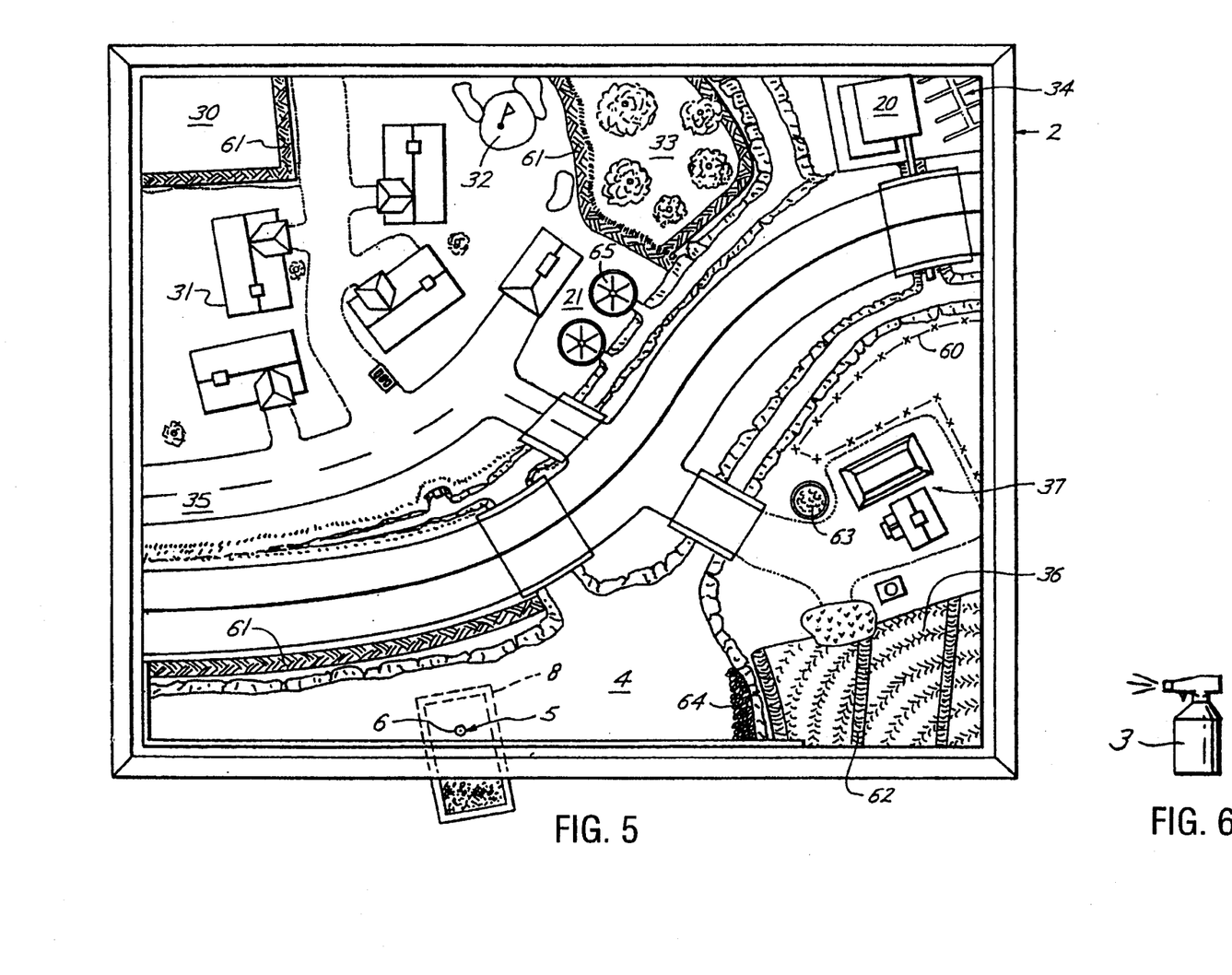
FIG. 5 is a top view of a portable simulated watershed model according to the present invention illustrating simulated water pollutant sources and simulated best management practices.
FIG. 6 is a fluid dispenser used in the present invention.

A fluid dispenser 3 is used according to the present invention to simulate rain over the portable simulated watershed model. The fluid dispenser may be a variety of devices. One embodiment of a fluid dispenser is a spray bottle with a variable atomizer or spout that allows varied strengths of spray. The variable atomizer spout may be used to simulate different strengths of simulated rain over the portable simulated watershed model. It is understood that there are numerous other ways to simulate rain over the portable simulated watershed model.

Simulated Best Management Practices

A further embodiment of the present invention includes simulated best management practices, placeable on selected portions of the simulated watershed model. As used herein, best management practices means systems, activities and structures that people may construct or practice to minimize non-point source pollution. Best management practices may be simulated with a variety of substances. One embodiment of the present invention contemplates using a miniature fence to simulate a containment fence for cattle, using a miniature manure container to simulate a containment structure for manure, using miniature covers to simulate sewage plant clarifier tank covers, using felt strips to simulate grass strips, using kidney bean shaped felt strips to simulate wet lands, and using a moldable substance such as clay, or the like, to simulate terraces and berm for containing loose soil on a plowed field. These best management practices are exemplary, and should not be considered to delimit the invention.

FIG. 5 is a top view of the simulated watershed model 2 and shows simulated best management practices placed on selected portions of the portable simulated water pollution model 2. Best management practices may be simulated on the portable simulated watershed model 2 by placing the simulated best management practices on selected portions of the portable simulated watershed model 2. For example, a plastic miniature fence 60 (simulating a cattle containment fence) may be placed to limit the range of the moveable cows 40. A plastic manure container 63 (simulating a manure containment structure) may be placed near the moveable cows 40. Plastic miniature covers 65 (simulating tank covers) placed on top of the sewage plant clarifier tanks 21. Felt strips 61 (simulating grass strips) may be placed near the construction site 30, the clear-cut forest 33, and the road 35. Kidney bean shaped pieces of felt 64 (simulating wet lands) may be placed near the plowed field 36. Clay formed to the desired shape 62 (simulating terraces and berm) may be placed near the plowed field 36.

It should be noted that the listing of these particular types of substances as simulations for best management practices is to be considered exemplary of the invention, and not delimiting. In general, the simulating substances are preferably non-toxic and easily cleanable, in order to facilitate and encourage the use of the invention with and by children.

Method for Simulating Water Pollution

A further embodiment of the present invention is a method for simulating water pollution in a watershed including providing a portable simulated watershed model, including at least one simulated body of water and at least one simulated water pollution source; providing at least one simulated water pollutant; placing the simulated water pollutant on selected portions of the portable simulated watershed model; and simulating rain over the portable simulated watershed model to cause the water pollutants to be washed into the simulated body of water.

A further embodiment adds the additional steps of providing at least one simulated best management practice, and placing the simulated best management practice on selected portions of the simulated watershed model prior to simulating rain over the simulated watershed model.

Portable Nature of the Present Invention

The portable nature of the present invention enhances its usefulness as a water pollution model to demonstrate graphically water pollution, either as a simulation of pollution arising from actual or potential environmental conditions, or as a teaching tool to create awareness and understanding of water pollution sources, water pollutants, and water pollution prevention techniques. The present invention model may be used, cleaned, transported to a different location, and used again within a short period of time and with relative ease.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A portable water pollution model, comprising:
   a portable simulated watershed model including at least one simulated body of water and at least one simulated water pollution source;
   at least one simulated water pollutant, placed on selected portions of said portable simulated watershed model; and
   a fluid dispenser capable of simulating rain over said portable simulated watershed model to cause said at least one simulated water pollutant to be washed into said at least one simulated body of water.

2. The model of claim 1, wherein said at least one simulated water pollution source includes:
   at least one fixed simulated water pollution source, immovably coupled to said portable simulated watershed model; and
   at least one moveable simulated water pollutant source, placeable on selected portions of said portable simulated watershed model.

3. The model of claim 1, wherein said at least one simulated water pollution source includes:
   at least one simulated point source water pollution source; and
   at least one simulated non-point source water pollution source.

4. The model of claim 1, wherein said at least one simulated water pollutant includes:
   at least one simulated point source pollutant; and
   at least one simulated non-point source pollutant.

5. The model of claim 1, further comprising:
   at least one simulated best management practice placeable on selected portions of said portable simulated watershed model.

6. The model of claim 1, further comprising:
   a portable carrying case for holding said portable simulated watershed model during transport.

7. A method for simulating water pollution, comprising:
   providing a portable simulated watershed model including at least one simulated body of water and at least one simulated water pollution source;
   providing at least one simulated water pollutant;
   placing said at least one simulated water pollutant on selected portions of said portable simulated watershed model; and
   simulating rain over said portable simulated watershed model to cause said at least one water pollutant to be washed into said simulated body of water.

8. The method of claim 7, wherein said step of providing a portable simulated watershed model includes:
providing at least one simulated point source pollution source; and
providing at least one simulated non-point source pollution source.

9. The method of claim 7, wherein said step of providing at least one simulated water pollutant includes:
providing at least one simulated point source pollutant; and providing at least one simulated non-point source pollutant.

10. The method of claim 7, further comprising:
providing at least one simulated best management practice; and
placing said at least one simulated best management practice on selected portions of said portable simulated watershed model prior to simulating rain over said portable simulated watershed model.

11. A portable water pollution model kit, comprising:
a portable simulated watershed model including at least one simulated body of water;
a plurality of simulated water pollutants, selectively placeable on portions of said portable simulated watershed model;
a rain simulator for simulating rain over said portable simulated watershed model; and
a portable carrying case removably containing said portable simulated watershed model, said plurality of simulated water pollutants and said rain simulator during transport.

12. The portable water pollution model kit of claim 11, said portable simulated watershed model comprising a polystyrene surface.

13. The portable water pollution model water kit of claim 11, said plurality of simulated water pollutants comprising non-toxic substances.

14. The portable water pollution model kit of claim 13, said non-toxic substances comprising food products.

15. The portable water pollution model kit of claim 11, further comprising, at least one simulated best management practice placeable on selected portions of said portable simulated watershed model.

16. The portable water pollution model kit of claim 15, said at least one simulated best management practice comprising non-toxic substances.

17. The portable water pollution model kit of claim 11, said portable carrying case including compartments adapted to contain said portable simulated watershed model, said plurality of simulated water pollutants and said rain simulator during transport.

* * * * *